United States Patent [19]

Beauchamp et al.

[11] Patent Number: 5,186,420
[45] Date of Patent: Feb. 16, 1993

[54] ARTICULATED FIN/WING CONTROL SYSTEM

[75] Inventors: Charles H. Beauchamp, Jamestown; Manuel Cincotta, Jr., Tiverton; Anthony V. Raffa, Newport; Benoit G. Gauthier, Little Compton, all of R.I.

[73] Assignee: The United States of America as represented by the Secretary of the Navy, Washington, D.C.

[21] Appl. No.: 790,607

[22] Filed: Nov. 8, 1991

[51] Int. Cl.$^5$ .............................................. B64C 3/44
[52] U.S. Cl. .................................. 244/219; 244/3.24; 244/90 R; 114/126; 114/144 RE
[58] Field of Search ............... 244/213, 214, 215, 219, 244/90 R, 89, 3.24; 60/527, 528; 114/126, 144 R, 144 RE

[56] References Cited

U.S. PATENT DOCUMENTS

| | | | |
|---|---|---|---|
| 954,682 | 4/1910 | Low et al. | 60/328 |
| 1,223,017 | 4/1917 | Zahm | 244/219 |
| 1,671,081 | 5/1928 | Miller | 244/233 |
| 3,704,828 | 12/1972 | Studer et al. | 244/219 |
| 4,086,769 | 5/1978 | Smith | 60/527 |
| 4,096,817 | 6/1978 | Bordat | 244/219 |
| 4,235,397 | 11/1980 | Compton | 416/240 R |
| 4,742,680 | 5/1988 | Mecca | 60/528 |
| 4,759,187 | 7/1988 | O'Hare | 60/527 |
| 4,761,955 | 8/1988 | Bloch | 60/528 |

FOREIGN PATENT DOCUMENTS

| | | | |
|---|---|---|---|
| 158099 | 1/1921 | United Kingdom | 244/219 |
| 2148444 | 5/1985 | United Kingdom | 60/528 |

*Primary Examiner*—Galen Barefoot
*Attorney, Agent, or Firm*—Michael J. McGowan; Prithvi C. Lall; Michael F. Oglo

[57] ABSTRACT

An articulated control surface is provided for hydrodynamic control utilizing a moldable control surface. The central surface is shaped by contracting and elongating wire bundles fabricated with shape-memory alloys located in an adjacent cooling chamber. The shape-memory alloys contract when heated via an applied electric current and elongate when cooled, i.e., the electric current is removed. A pair of wire bundles is anchored inside the cooling chamber. Each bundle is routed over several pulleys in such a manner that a lateral movement is produced at the actuator end of the wire. A pair of bundles act in opposition to maintain dynamic tension at the actuator end. Cooling flow to opposing wire bundles is controlled independently to enhance response time and reduce power requirements. The actuator is a post extending from the cooling chamber to the trailing edge structure of the control surface.

9 Claims, 4 Drawing Sheets

ARTICULATED FIN/WING CONTROL SYSTEM

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

(1) Field of the Invention

The present invention generally relates to control surfaces and more particularly to an articulated control surface system for creating a curved control surface.

(2) Description of the Prior Art

It is well known that control surface actuator noise, as well as flow separation induced noise created by current "rigid" control surfaces, are significant sources of unwanted noise on underwater and airborne vehicles. All present actuators exceed the maximum allowable noise levels established for the Far Term Torpedo. A variety of techniques have been used to reduce the amount of noise created by existing electro/mechanical actuators. In general, these efforts have concentrated on balancing and isolating the moving parts and gears as well as providing fixed hydro/aerodynamic fairings. Unfortunately, even in the best prior art designs, electro/mechanical actuator-driven control surfaces suffer from the following drawbacks:

(1) Electro/mechanical, hydraulic or pneumatic activation of the control surface results in gear and motor noise;

(2) Significant size and weight of actuators add to the overall size and weight of the vehicle, while the seals and bearings associated with these actuators impose concurrent depth limitations and require precise machining tolerances;

(3) Control surfaces have limited placement possibilities since the control surfaces must have through-hull drives for electro/mechanical or hydraulic actuator systems;

Further, the rigid nature of these control surfaces increases the size of the turbulent wake behind the control surface thereby generating significant flow noise levels. The flow noise is created by three mechanisms: (1) the turbulence directly radiating to the near and far field, (2) the induced noise due to the turbulent excitation of the control surface and the surrounding structure, and (3) interaction of the control surface wake with the propulor. The latter causes fin and structure re-radiation which is the dominant flow noise source. Dominant flow noise is affected by a multiplicity of structural factors including:

(4) Control hinge gap interrupting flow over the control surface and causing flow separation; and (5) Increased shed vorticity and turbulent wake created by the rigid control surface, thereby inducing turbulent excitation of the rigid control surface.

(6) Flow disturbance in the wake of control surfaces where typical propulsors, i.e. propellers, are located thereby greatly contributing to turbulence ingestion noise.

Recently, a novel approach has been conceived at the Naval Underwater Systems Center in Rhode Island. This approach utilizes a unique metal alloy that changes shape in response to electrical impulses. Since these shape changes can be tailored to create a curved surface, no conventional electro/mechanical devices are required to provide the hydrodynamic turning forces necessary for vehicle control. This effect eliminates typical through-hull drives and allows essentially universal placement of the control surfaces since only electrical power wires are required to create movement. This flexibility in placement can be used to great advantage by locating control surfaces behind the propulsor for reduced noise and improved efficiency. The operation of the control surface using the cambering in this invention is essentially silent. The cambered shape of the control surface foil also improves the lift coefficient compared to an equivalent symmetrical foil at the same angle of attack. At an equivalent lift coefficient, the articulated, or cambered shape produces less flow separation and thus less flow noise than a conventional symmetrical foil.

The original device disclosed in a patent application, Ser. No. 07/591,532 and filing date Oct. 1, 1990, by M. Cincotta and R. Nadolink, described a shape memory alloy actuator embedded in an elastomer foil shape. This configuration has the disadvantages of low mechanical advantage and severe space limitation. The space limitations result in limiting the number and length of wires which can be used, thus limiting the maximum deflection angle which can be obtained on the control surface.

The operation of the alloy requires specific thermal cooling from the ambient environment and control of the cooling rate is the key to development of the concept. In small vehicles the space limitations of the invention proposed by Cincotta and Nadolink reduce the potential for establishment of natural convection cells in heat transfer fluid surrounding the wires, thus reducing the wire cooling rate.

SUMMARY OF THE INVENTION

Accordingly, it is an object of the present invention to provide an improved control surface system for use in producing lift forces to aid in the maneuvering of any type of vehicle.

It is a further object of the present invention to provide a control surface system that overcomes the drawbacks of the aforementioned prior art electro/mechanical, hydraulic or pneumatic designs.

It is still a further object of the present invention to provide a variable camber control surface having low shed vorticity and low induced drag.

It is another object of the present invention to provide an improved control surface actuator having an improved mechanical advantage.

It is still another object of the present invention to provide an improved control surface actuator having improved deflection capability.

It is yet another object of the present invention to provide a shape memory alloy actuator having improved cooling.

Other objects and advantages of the present invention will become more apparent hereinafter in the specification and drawings.

The above objects are realized by providing a control surface system that shapes a moldable control surface using shape memory alloy wire bundles. The moldable control surface is constructed of an elastomer with a spring metal backbone. The leading edge of the control surface is rigidly affixed to a vehicle body or other structure while the trailing edge is mounted on a moveable camber post. Movement of the trailing edge camber post is accomplished by changing the lengths of a pair of the shape memory alloy wire bundles. Each wire bundle is anchored to the vehicle structure on a first end and attached to the trailing edge camber post thereby providing a lateral driving force. The fibers are heated through application of electrical voltage. When the electrical voltage is removed, the fibers elongate as they cool, thereby returning the moldable control surface to its original shape.

The cooling of the wire is enhanced by flow of ambient fluid through the inlet on outlet ports. The ports are located such that the dynamic pressure on the external surface of the cooling chamber provide the pressure differential required to pump the ambient fluid through the chamber. A baffle is located between the opposing wire bundles. Inlet and discharge ports on each side are gated. The gates are open via an electronic signal when cooling is required and closed when the wire bundle is being heated. This feature will significantly reduce the cooling time without increasing the power requirements during the heating cycle.

DESCRIPTION OF THE PREFERRED EMBODIMENT

Figure 1:
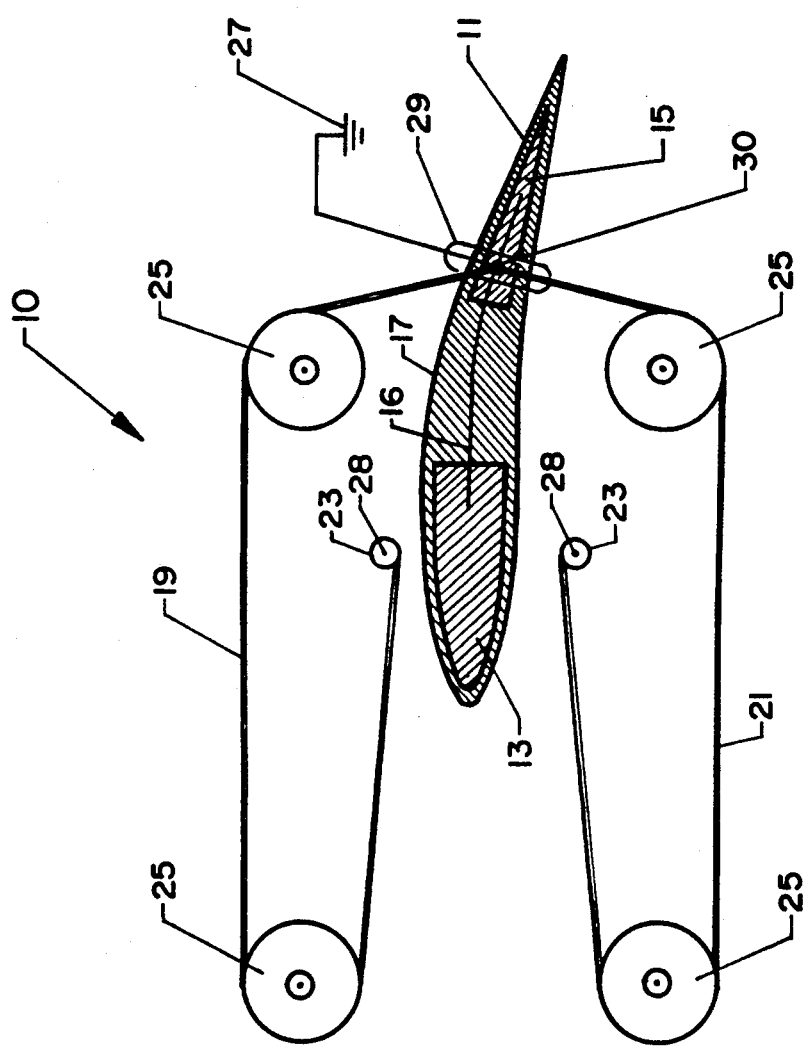
FIG. 1 is a schematic view of the articulated fin/wing of the present invention showing the shape memory wire bundle activation.

With reference to FIG. 1, the control surface system, designated generally by the reference numeral 10, is shown with the actuating elements and drive assembly in schematic and moldable control surface 11 in cross-section. Moldable Control surface 11 is fabricated with an internal leading edge structure 13 and internal trailing edge structure 15. A spring metal backbone 16 connects the leading and trailing edge structures and maintains the symmetrical shape of the surface when control system actuating forces are removed. The cross section of the spring backbone can be varied along its length to hydrodynamically optimize the curvature of the control surface. The center section of the moldable control surface and the outside skin is an elastomer 17. The elastomer provides the necessary flexibility to allow cambering of the hydrofoil when control forces are applied.

A plurality of wires fabricated of shape-memory alloys form wire bundle 19 and wire bundle 21, each acting in opposition to each other. The bundles are anchored at anchor post 23 (shown as two points for clarity only). Insulated pulleys 25 provide sufficient path length to the wire bundles and a proper actuating angle so that lateral movement of cambering post 30 is achieved. Power supply 28 selectively provides power to each wire bundle thereby heating the selected bundle, causing that bundle to contract and thereby camber the moldable surface. A ground 27 is provided at cambering post 30 to complete the electrical circuit. Plate 29 is an oval shaped-plate which provides a non-pressure fairing seal at the camber post and fairing intersection.

Figure 2:
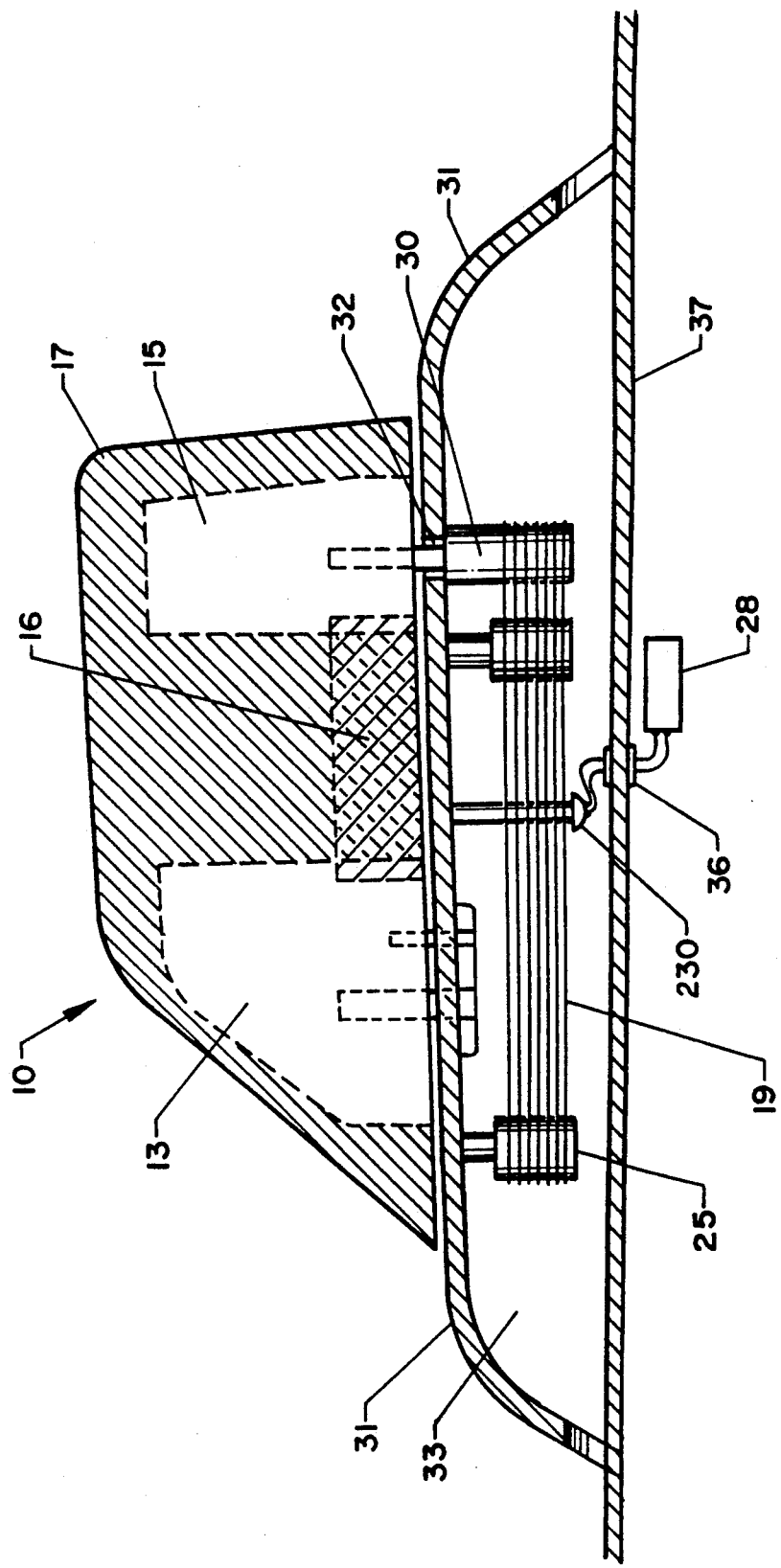
FIG. 2 is a cross-sectional top view of the fin/wing showing the hull mounting.

Referring now to FIG. 2, a top view cutaway shows the platform of the internal leading edge structure 13, spring-metal backbone 16, and internal trailing edge structure 15. Elastomer 17 encapsulates the control surface 11. The leading edge structure 13 is rigidly attached to the fairing 31 which encloses cooling chamber 33. A baffle down the center of the cooling chamber separates flow over each opposing wire bundle. The actuating elements, i.e., shape-memory wire bundles 19, and the drive mechanism, pulley 25 and anchor post 23 are housed within the cooling chamber 33. Cambering movements are transmitted from the drive mechanism to the trailing edge structure by cambering post 30. Cambering post 30 acts through a slot 32 in the side of the cooling chamber. No pressure seal is necessary as the entire structure is attached outside of the pressure hull 37. Power supply 28, for powering the shape-memory bundles is within the hull, however, only electrical wires penetrate the hull allowing a positive seal 36.

The shape memory alloys in the wire bundles change internal molecular structure at certain temperatures. Macro movement is obtained by cycling a sufficient length of the alloy between two temperatures. Shape memory alloys in the form of fibers are commercially available which retain shape memory characteristics for millions of cycles. Electric current is used to generate heat, resulting in temperature change in the shape memory alloy, which then results in a change of length of the shape memory alloy. One such shape memory alloy is BioMetal TM manufactured by Toki Corporation of America, Irvine, Calif. Another is Flexinol TM manufactured by Dynalloy, Inc., Irvine, Calif.

The standard sizes of a BioMetal TM and Flexinol TM fiber with a range of diameters from 0.006 in to 0.010 in was used in the preferred embodiment. However, the invention is not limited to this size fiber. Indeed, shape memory alloy fibers may be any size diameter. The fibers 19 may also be a continuous sheet of a shape memory alloy, such as a belt, depending on design constraints. The fibers may also be a variety of shape memory alloys, each having various shape memory characteristics depending on the type of shape desired from moldable control surface 11.

Figure 3:
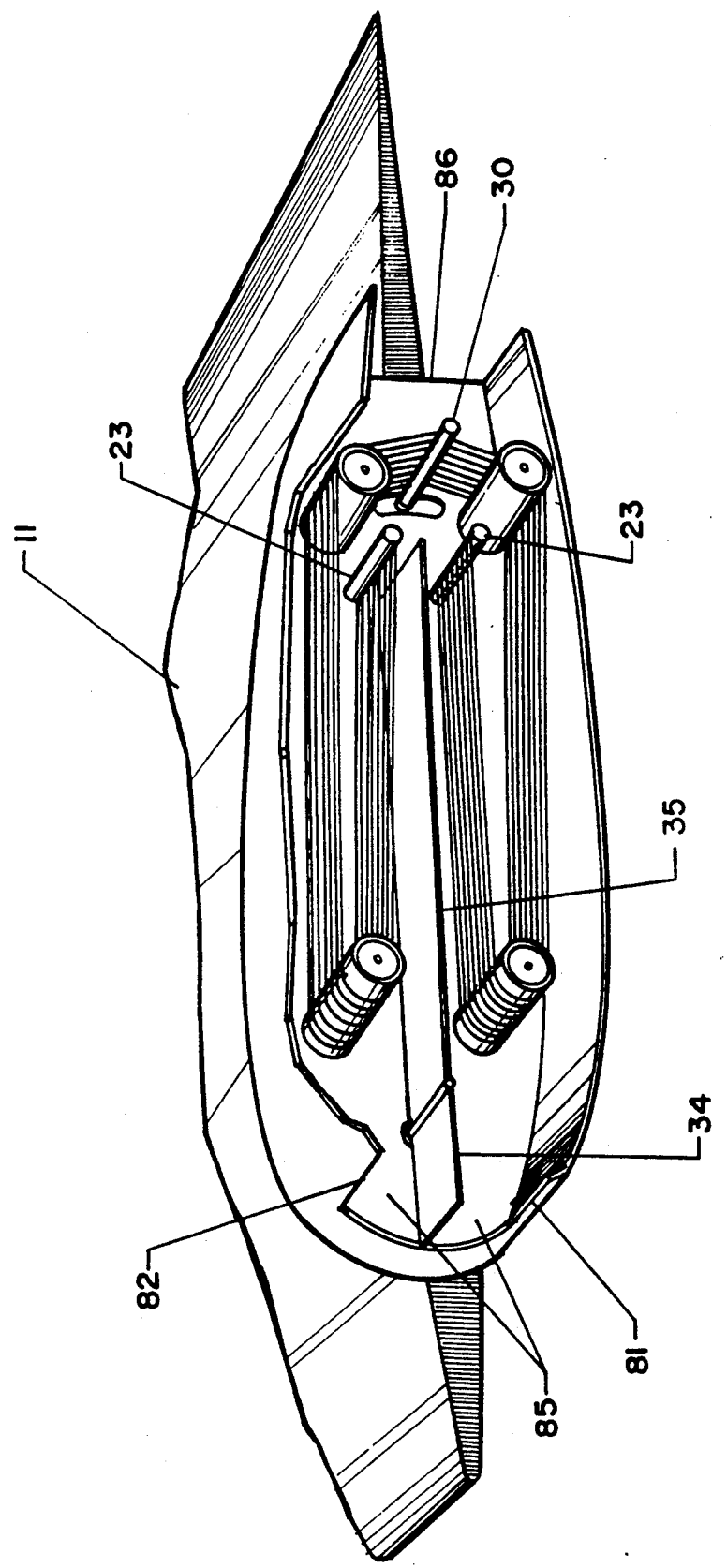
FIG. 3 is a perspective cut away view of the actuating elements and drive assembly showing the cooling water diverter.

Referring to FIG. 3, cooling of the fibers, in order to provide rapid response, is aided by inlet control 34 at the entry 85 to cooling chamber. Cooling chambers for each opposing bundles of wires are separated by a baffle 35. A variety of convention inlet controls may be used as is known in the prior art. Any other conventional means may also be used to restrict coolant flow into the chamber during the portion of the duty cycle when the shape memory alloy wires are heated. In the preferred embodiment, the inlet flow is controlled by a moveable divertor plate 34 which allows increased cooling flow. The shape memory alloy wire bundle which is not being heated and deceased cooling flow to the shape memory alloy wire bundle which is being heated. Cooling water flow exits through outlet 86. The depiction of FIG. 3 is enlarged compared to actual dimensions for clarity. In an alternative embodiment, the inlet opening is controlled by a small shape memory alloy activator.

Figure 4:
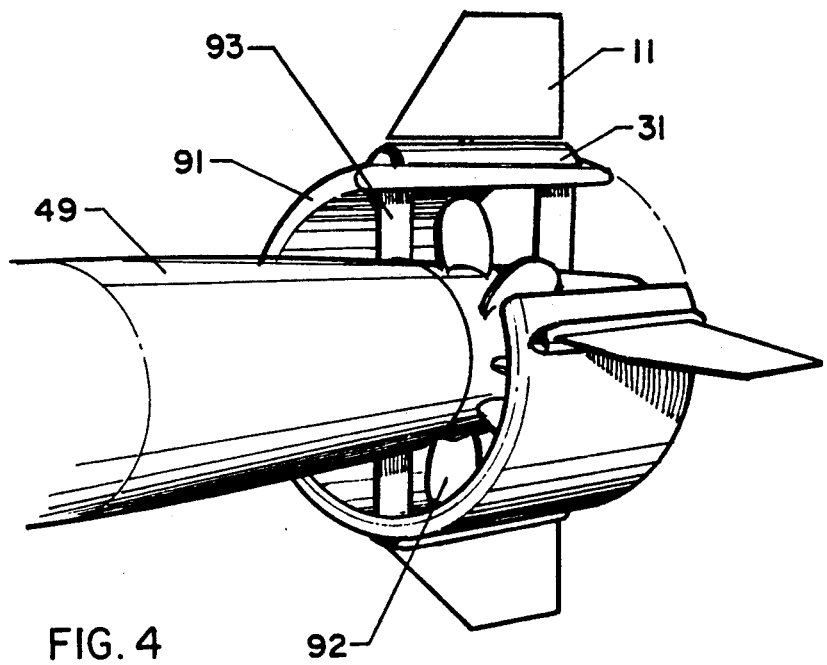
FIG. 4 is a partial perspective view of the control system shown as an external add-on device to a ducted-propulsor system.

FIG. 4 shows a perspective view of an underwater vehicle hull 49 having a ducted propulsor 91. The control surface system is shown with a scab-on type fairing 31 which contains the actuating elements of the invention which operate moldable control surface 11. The location of drive blades 92 put severe limitation on the use of conventional control surfaces at this location because mechanical drive shafts and other mechanisms be passed through the duct support vanes 93. These vanes interfere with the ducted flow. The control surface system of this invention however requires only an electrical connection. Therefore there is more flexibility in the design of the control surface and the size of the support vanes may be reduced.

Figure 5:
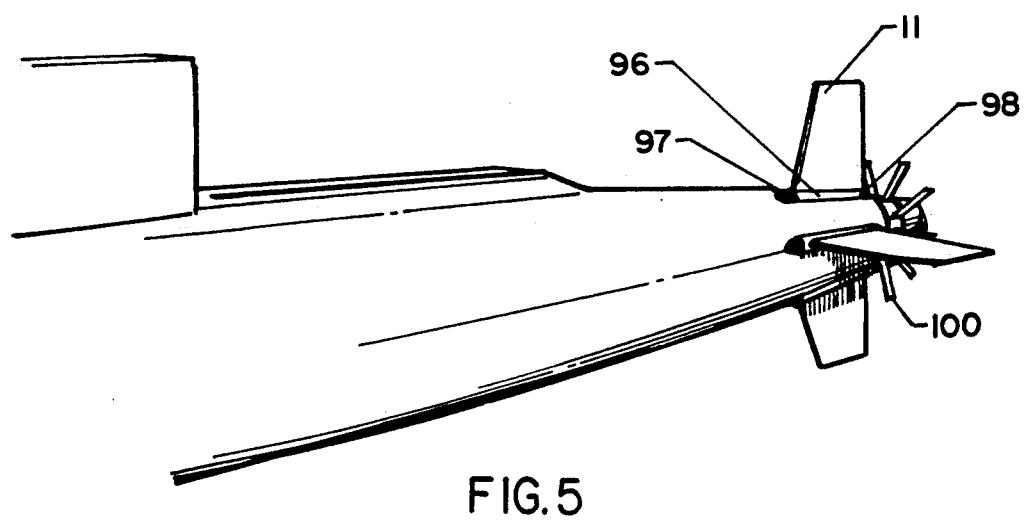
FIG. 5 is a partial perspective view of the control system shown embedded in the hull line of a vehicle.

Referring to FIG. 5, an alternate embodiment of the control surface system shows the actuators and drive assembly 96 flush with the hull line. Although the assembly 96 is embedded in the hull, it remains outside the pressure hull, thereby avoiding the problems associated with through-hull moving shafts or other through-hull mechanisms. Inlet 97 draws cooling water into the drive assembly 96 as previously described and outlet 98 discharges cooling flow just prior to screw 100. Moldable control surface 11 operates in the same manner as the prior description.

The advantages of the present invention are numerous. The invention eliminates bulky in-hull operating mechanism while, by use of the fairing and cooling chamber, it remains suitable for small control surfaces including those surfaces which are too small to enclose the shape-memory alloy actuating system. The invention eliminates through hull moveable seals by locating the actuating mechanism outside the pressure hull. The invention reduces noise due to conventional mechanical activator and due to flow turbulence. Essentially the mechanical operation of the control surface is silent and the flow turbulence noise greatly reduced.

The particular embodiments described herein may be modified without departing from the scope of the invention. For example, the fairing chamber containing the actuating elements may be modified by embedding the chamber in the vehicle hull or by placing the actuating elements inside the hull and sealing the appropriate area. Other changes in various details, materials, steps and arrangement of parts, which have been herein described and illustrated in order to explain the nature of the invention, may be made by those skilled in the art within the principle and scope of the invention as expressed in the appended claims.

What is claimed is:

1. An improved moldable control surface system wherein the improvement comprises:
   a two-chambered cooling compartment for enclosing and mounting control surface linear actuating elements and drive assembly;
   anchor posts suitable for attachment of shape-memory wire bundles located on an interior end of said cooling compartment;
   a drive assembly including support brackets with guide pulleys for wire bundles, located on an interior side of said cooling compartment;
   a means for shaping a moldable control surface comprising shape-memory wire bundles forming the linear actuating elements of said shaping means, each wire bundle attached on a first end to said anchor post and routed along the guide pulleys of said drive assembly whereby a lateral output movement is produced at a second end;
   a means for cambering a moldable control surface comprising a cambering post having a cooling compartment end and a control surface end and being attached at the cooling compartment end to said shape-memory wire bundles and receiving a lateral output movement therefrom, thereby providing bi-directional movement of a moldable control surface;
   said moldable control surface fabricated of an elastomer with an embedded spring metal backbone having a trailing edge structure attached to said moveable cambering post and having a leading edge structure rigidly attached to the exterior wall of said cooling compartment;
   a means for heating said shaping means comprising an electrical power source attached to said shape-memory wire bundles whereby electrical power is applied to heat said bundles and thereby actuate the cambering action; and
   a means for cooling said shaping means comprising a two-chambered cooling compartment wherein ambient fluid flows over said shape-memory wire bundles to cool said bundles and thereby return said moldable control surface to its original shape.

2. An improved moldable control surface system wherein the improvement comprises:
   means for shaping said moldable control surface, located external to and remote from said moldable control surface and having linear actuating elements which contract upon heating and expand upon cooling;
   means for cambering said moldable control surface affixed to the trailing edge structure of said control surface, one of said linear actuating elements connected to and driving a first side on said means for cambering in a first direction and another of said linear actuating elements connected to and driving a second side of said means for cambering in a second direction, thereby providing bi-directional movement of said moldable control surface; and
   means for separately cooling said linear actuating elements attached to said moldable control surface.

3. An improved control surface system as in claim 2 wherein said means for cooling said shaping means comprises a cooling compartment having a coolant inlet and outlet and a slotted aperture and having enclosed therein, said linear actuating elements and a drive assembly.

4. A cooling compartment as in claim 3 wherein an ambient external cooling fluid flows over each said linear actuating element and is separately controlled to improve cooling response time and to reduce power requirements during heating.

5. A control surface system as in claim 3 wherein said linear actuating elements comprise a pair of wire bundles, each fabricated with a plurality of shape-memory alloy wires acting in parallel.

6. An improved control surface system as in claim 3 wherein said drive assembly is a plurality of pulleys and anchor points providing a dual path from an anchor point to an actuating end of each of said linear actuating elements such that shape-memory alloy wire bundles of each of said linear actuating elements on such path pull in opposition to each other thereby providing said bi-directional movement of said moldable control surface.

7. A control system as in claim 2 wherein said means for cambering is a cambering post attached to and extending from the trailing edge structure of said moldable control surface with structure for connecting to said means for shaping.

8. A means for cambering as in claim 7 wherein said cambering post further comprises a post having a non-pressure fairing seal.

9. A moldable control surface system for use on aerodynamic and hydrodynamic surfaces comprising:
- a moldable control surface having an inner structure comprising a rigid leading edge section connected by a metal spring to a rigid trailing edge section, and having an outer structure comprising an elastomer material forming a solid fluid dynamic foil over the inner structure;
- a shape memory alloy actuating assembly attached to the rigid trailing edge section of said moldable control surface and comprising a pair of opposing shape memory alloy wire bundles routed over a pulley arrangement to provide moldable control surface cambering;
- a two-chamber cooling compartment providing a mount for said moldable control surface and a chamber for each of said shape memory alloy wire bundles and having an inlet control allowing opening and closing of a cooling flow to each said chamber; and
- an electrical power supply connected to said shape memory alloy actuating assembly, to provide direct heating to the shaped memory alloy wire bundles.

* * * * *